United States Patent
Alawani et al.

(10) Patent No.: US 11,057,386 B2
(45) Date of Patent: Jul. 6, 2021

(54) DYNAMIC AUTHENTICATION AND AUTHORIZATION MECHANISMS

(71) Applicants: Shrinivas Alawani, Bangalore (IN);
Gurwinder Singh, Sunam Punjab (IN);
Kumararaja Panneer Selvam,
Bangalore (IN)

(72) Inventors: Shrinivas Alawani, Bangalore (IN);
Gurwinder Singh, Sunam Punjab (IN);
Kumararaja Panneer Selvam,
Bangalore (IN)

(73) Assignee: Unisys Corporation, Blue Bell, PA (US)

(*) Notice: Subject to any disclaimer, the term of this patent is extended or adjusted under 35 U.S.C. 154(b) by 128 days.

(21) Appl. No.: 16/111,286

(22) Filed: Aug. 24, 2018

(65) Prior Publication Data
US 2019/0372979 A1 Dec. 5, 2019

(51) Int. Cl.
*H04L 29/06* (2006.01)

(52) U.S. Cl.
CPC .......... *H04L 63/101* (2013.01); *H04L 63/083* (2013.01)

(58) Field of Classification Search
CPC . H04L 63/08; H04L 63/0807; H04L 63/0815; H04L 63/0823; H04L 63/083; H04L 63/0876; H04L 63/10; H04L 63/101; H04L 63/102; H04L 63/108; H04L 63/0838
See application file for complete search history.

(56) References Cited

U.S. PATENT DOCUMENTS

2015/0089622 A1* 3/2015 Sondhi ............... H04L 63/0853 726/9
2017/0329957 A1* 11/2017 Vepa ...................... G06F 21/34

* cited by examiner

*Primary Examiner* — Edward Zee (57) ABSTRACT

A computing system architecture includes a token generator communicable with a client token agent. The client token agent is communicable with a client database access agent. A database management system is communicable with the token agent. The database management system is communicable with the client database access agent. A client authorization management system is communicable with the database management system. The client authorization management system stores a list of authorized operations for a client. The list of authorized operations is configured to be changeable during a client login session.

7 Claims, 9 Drawing Sheets

| User ID/file ID | Generated token | Token start time | Token end time | IP address | User agent | Operation |
|---|---|---|---|---|---|---|
| File1/User1 | Token1 | Starttime1 | Endtime1 | address1 | Agent1 | Operation1 |
| File2/User2 | Token2 | Starttime2 | Endtime2 | address2 | Agent2 | Operation2 |
| FileN/UserN | TokenN | StarttimeN | EndtimeN | addressN | AgentN | OperationN |

DYNAMIC AUTHENTICATION AND AUTHORIZATION MECHANISMS

FIELD OF THE DISCLOSURE

The present invention relates generally to internet security infrastructure. More particularly, the present invention relates to dynamic authentication and authorization.

BACKGROUND

Security is a major concern in all internet based applications and services. Almost all internet based applications and services include both authentication and authorization issues. Authentication is a validation process of the identity of the user. A common authentication process includes checking the username and password of the user. Authorization is a process of granting or denying a specific operation request made by the user. For example, a user may have access to certain files but not others. Or, a user may have authority to read a specific file but not editing it.

Currently, authentication and authorization are dealt with as two separate issues. For example, once a user is authenticated, the database management system checks what authorities this user has at the time of login and proceeds accordingly. There is no mechanism to change the authorities, i.e., permissible operations, this user has during a single login session.

This specification discloses different mechanisms involving the use of token for authentication and authorization simultaneously. The embodiments disclosed herein are also directed to dynamic authorization, meaning the permissible operations can be changed during a single login session.

The embodiments disclosed herein have major advantages over current solutions. First, the specific token generation mechanisms disclosed increase the security level for the authentication. Second, the authentication and authorization issues are dealt with simultaneously. Third, the dynamic authorization allows immediate change of permissible operations even during a single login session, which is impossible under current solutions which treat authorization and authentication as two separate issues.

SUMMARY

The present invention relates generally to interact security infrastructure. More particularly, the present invention relates to dynamic authentication and authorization.

According to one embodiment, a computing system architecture includes a token generator communicable with a client token agent. The client token agent is communicable with a client database access agent. A database management system is communicable with the token agent. The database management system is communicable with the client database access agent. A client authorization management system is communicable with the database management system. The client authorization management system stores a list of authorized operations for a client. The list of authorized operations is configured to be changeable during a client login session. A token is generated for the client login session, the client is being required to provide the token to the database management system at the time of login for authentication.

According to one embodiment, a computing system architecture includes a token generator communicable with a client token agent. The client token agent is communicable with a client database access agent. A database management system is communicable with the token agent. The database management system is communicable with the client database access agent. A client authorization management system is communicable with the database management system. The client authorization management system stores a list of authorized operations for a client. The list of authorized operations is configured to be changeable during a client login session.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the concepts and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed systems and methods, reference is now made to the following descriptions taken in conjunction with the accompanying drawings.

DETAILED DESCRIPTION

Figure 1:
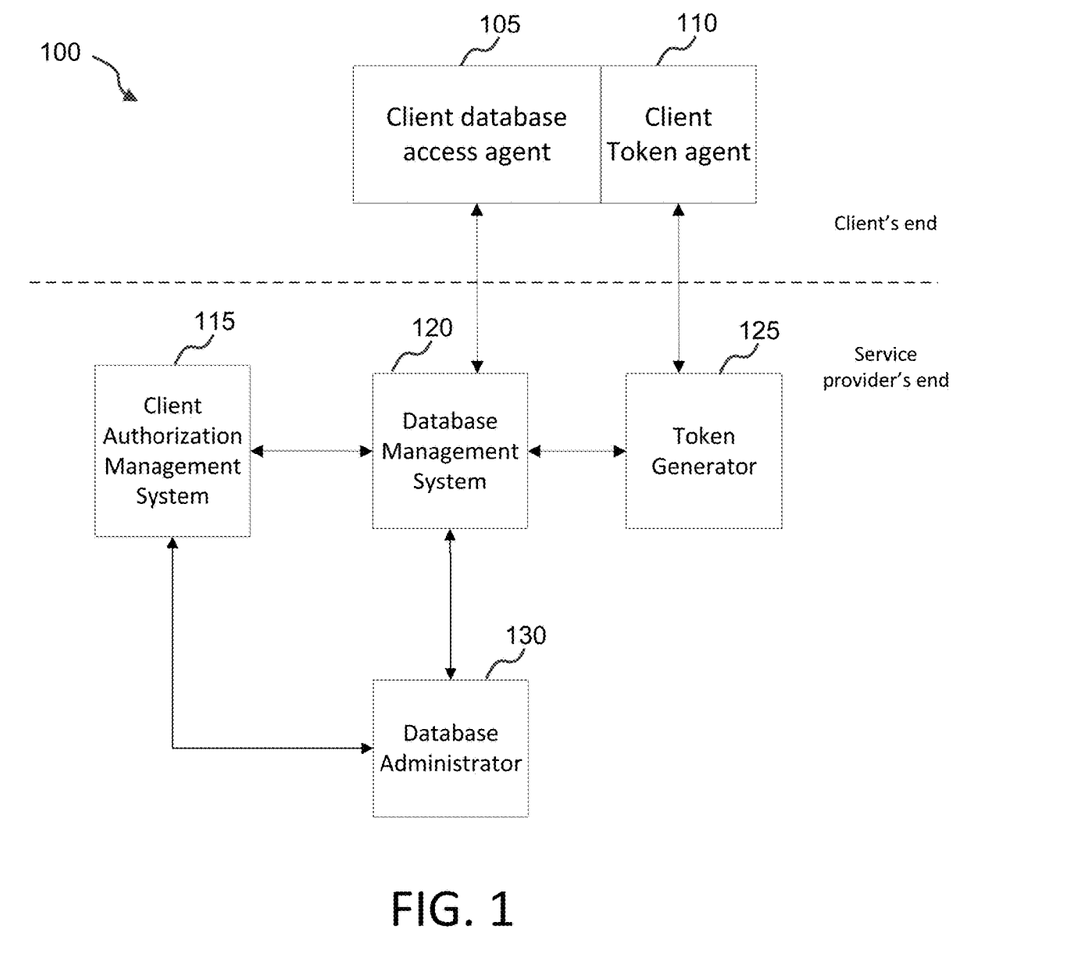
FIG. 1 is a schematic block diagram of an interact infrastructure for dynamic authentication and authorization according to one embodiment of the disclosure.

FIG. 1 is a schematic block diagram of an internet infrastructure 100 for dynamic authentication and authorization according to one embodiment of the disclosure. The infrastructure 100 includes client database access agent 105 (the "access agent 105"), client token agent 110 ("token agent 110"), client authorization management system 115 (the "authorization system 115"), database management system 120, token generator 125, and database administrator 130.

The access agent 105 refers to the software application that the client use to access the database. In one embodiment, the access agent 105 may be a standalone application or a general internet browser. In another embodiment, the access agent 105 may also refer to the device that the client uses to access the database. For example, the client agent can be the mobile phone, the laptop, the stationary computer, etc. that the client uses to access the database. The access agent 105 communicates with the database management system 120.

The token agent 110 refers to the software application or a physical device at the client's end that generates a security key. The token generated key can be used for both authentication and authorization purposes. Applicant notes that currently, token key is only used for authentication, not authorization. The embodiment disclosed herein uses the token for both authentication and authorization. The access agent 105 is communicable with the token agent 110. In one embodiment, the access agent 105 and the token agent 110 are two separate applications on a single client device. For example, the access agent 105 and the token agent 110 can be two different applications on a single mobile phone. In one embodiment, the access agent 105 and the token agent 110 are two separate applications on two different devices. In another example, the access agent 105 may be an application of a laptop and the token agent 110 is a separate application on a cell phone.

Figure 3:
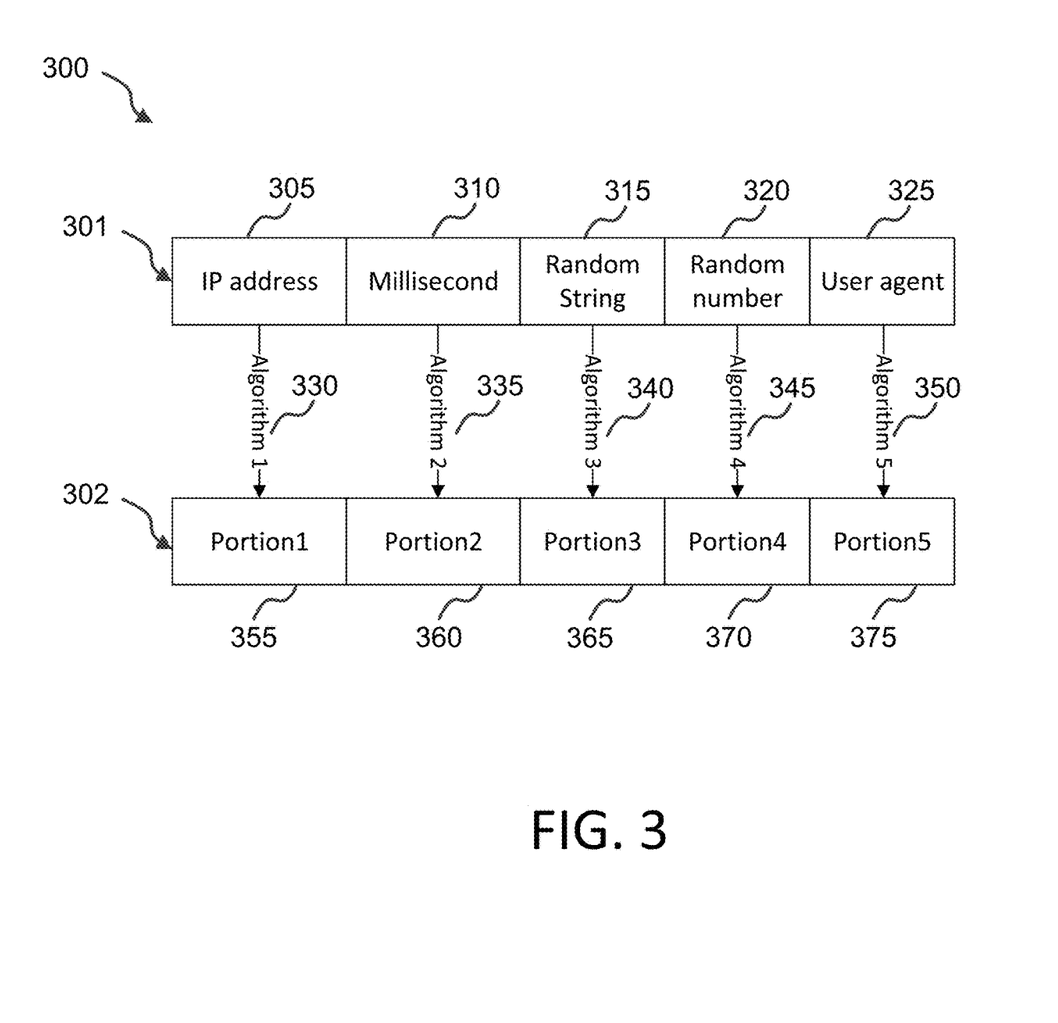
FIG. 3 is a schematic diagram of generating a token according to one embodiment of the disclosure.

The token agent 110 is in client's control. The client can request to generate a token when trying to log in the database services. When requested, the token agent 110 sends a request to the token generator 125 at the service provider's end. The token generator 125 generates a one-time-use token and send it back to the token agent 110. The token generator 125 generates the token according to some specific algorithms. In one embodiment, FIG. 3 illustrates specific processes of generating the token 300. The token generated by the token generator 125 may expire after a predetermined period, 30, 45, 60 seconds.

The token generator 125 communicates with the database management system 120. In one embodiment, the token generator 125 informs the database management system 120 about the identity of the client, the paired one-time-use token, and the expiration time of the one-time-use token. The database management system 120 may verify the authentication information, e.g., identity of the client, the paired one-time-use token, and the expiration time of the one-time-use token, when the client attempts to login. The token generator 125 also sends the identity of the client and the paired one-time-use token to the client authorization management system 115.

Once the client is authenticated, the database management system 120 starts to receive specific operation requests from the client. The database management system 120 keeps an activity log that records the identity, the one-time-use token, the operation request, the time of the operation requests was made, or the like. Once the client is authenticated, the database management system 120 informs the client authorization management system 115 that the client completed the authentication. The client authorization management system 115 updates the record to reflect the current token associated with the client identity.

Before granting any operation request, the database management system 120 verifies with the client authorization management system 115 to see whether the client, at the time of checking, has the authority to perform the specific operation. If the records at the client authorization management system 115 shows that the client, at the time of checking, has the authority for the operation, then the database management system 120 grants the operation. If the records at the client authorization management system 115 shows that the client, at the time of checking, does not have the authority for the operation, then the database management system 120 denies the operation.

The database administrator 130 communicates with both the client authorization management system 115 and the database management system 120. The database administrator 130 can update the client's authority at any time, even during that client's login session. For example, at the time the client logged in, the client has authority for reading and writing File X. During the same login session, because of some security reasons, the administrator takes away the writing authority of the client by updating the records stored at the client authorization management system 115. Once the record at the client authorization management system 115 is changed, even during a same login session, the client will be denied for writing File X. Such functionality does not exists in current authentication and authorization process. This functionality is made possible, at least partly, because a token, is used for both authorization and authentication simultaneously.

Figure 7:
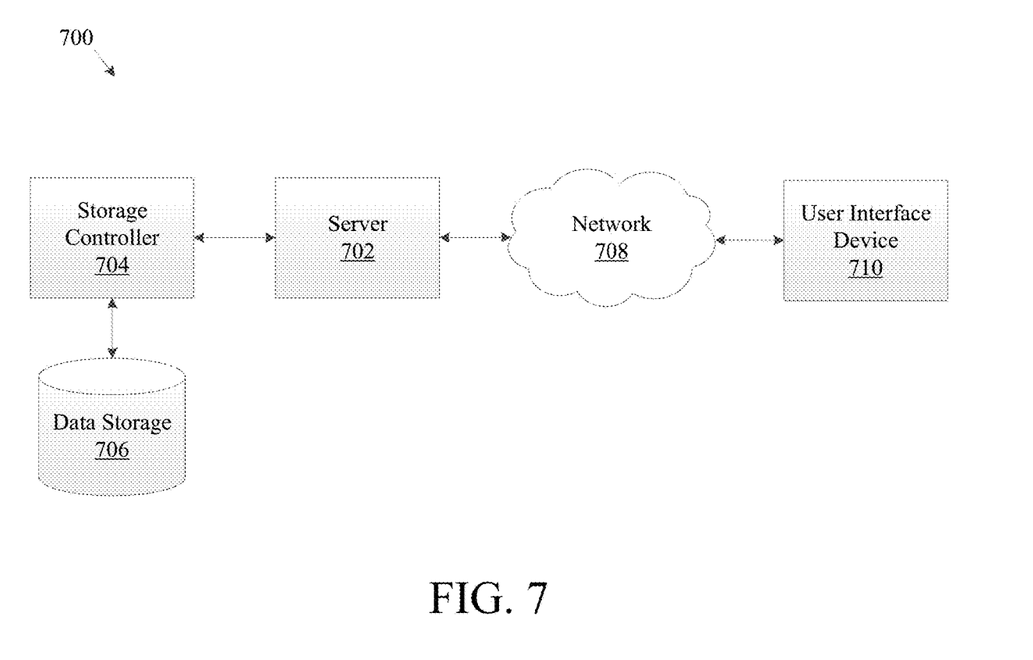
FIG. 7 is a block diagram illustrating a computer network according to one embodiment of the disclosure.
Figure 8:
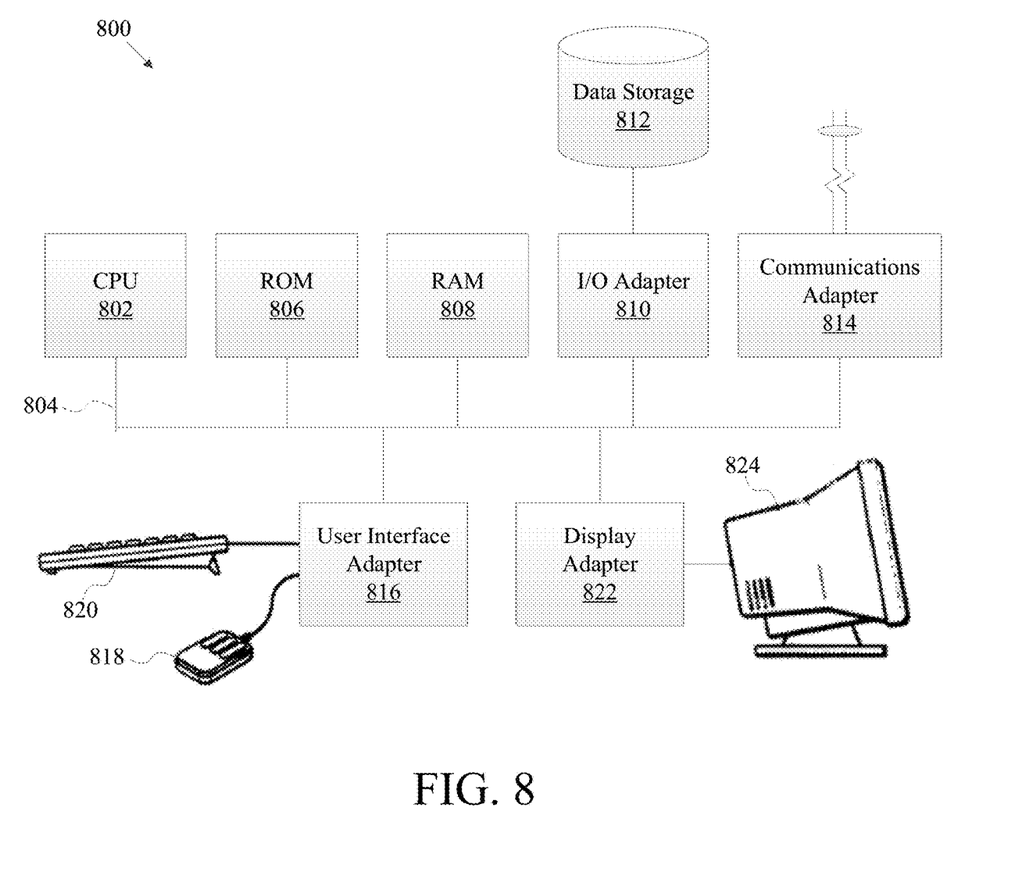
FIG. 8 is a block diagram illustrating a computer system according to one embodiment of the disclosure.
Figure 9A:
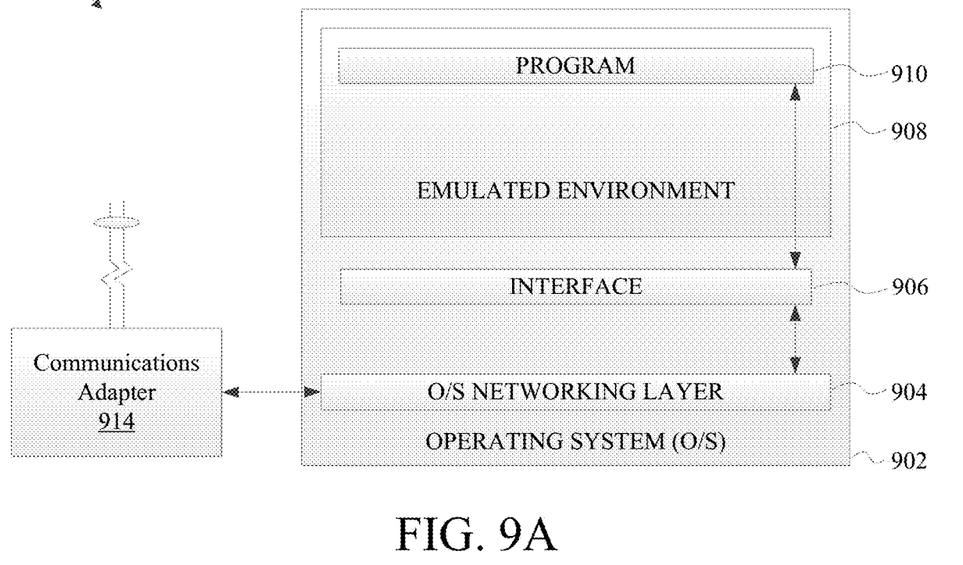
FIG. 9A is a block diagram illustrating a server hosting an emulated software environment for virtualization according to one embodiment of the disclosure.
Figure 9B:
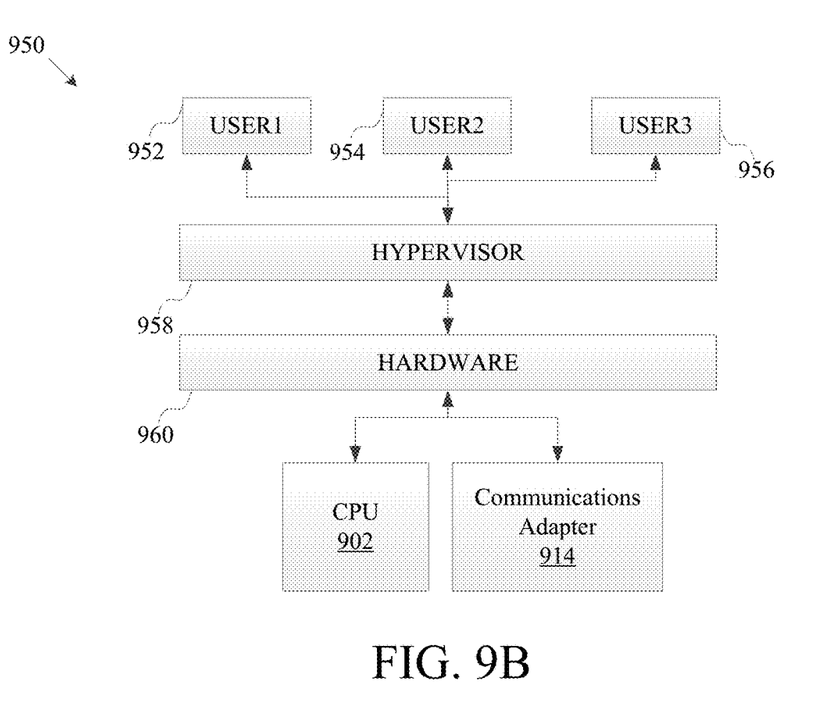
FIG. 9B is a block diagram illustrating a server hosting an emulated hardware environment according to one embodiment of the disclosure.

The internet infrastructure 100 can be implemented with the computer network 700 as shown FIG. 7. The Internet infrastructure 100 can be implemented with the computer system as shown in FIG. 8. The internet infrastructure can be implemented with the virtual machines 900, 950 as shown in FIGS. 9A and 9B.

Figure 2:
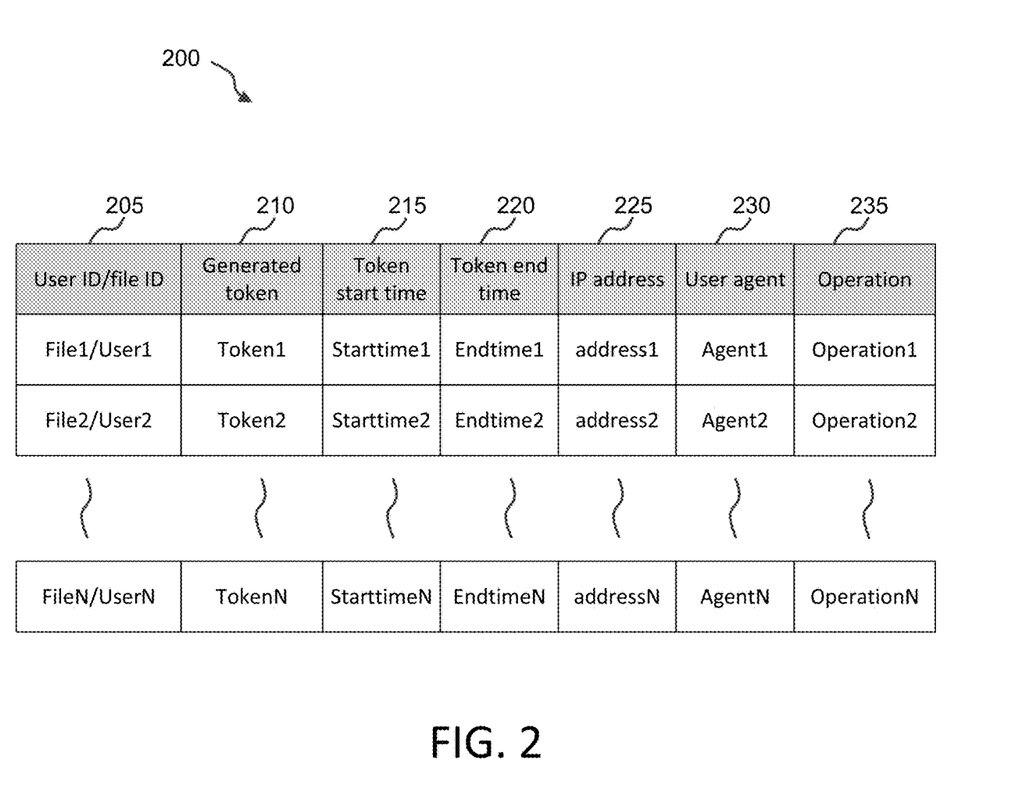
FIG. 2 is a schematic diagram of an activity log of a database management system according to one embodiment of the disclosure.

FIG. 2 is a schematic diagram of an activity log 200 of a database management system 120 according to one embodiment of the disclosure. The log 200 includes different data columns. The columns include user ID/file ID 205, generated token 210, token start time 215, token end time 220, IP address 225, user agent 230, and operation 235.

In one embodiment, the log 200 is in dynamic database format which means any column or any field is searchable and can be rearranged as the indexing column. For example, a system administrator can index the log 200 using user ID/file ID 205, generated token 210, token start time 215, token end time 220, IP address 225, user agent 230, and operation 235.

As shown in FIG. 2, column 205 may include user ID or file ID. In one embodiment, the log 200 records all accessed by a specific user. In another embodiment, the log 200 records all users that accessed a specific file.

Column 210 includes the token that is used in association with the user of the specific operation. Column 215 includes the token start time 215 which is the time the token was issued by the token generator 125. Column 220 includes the token end time 220 which is the time the token expires. There is a policy for a token to expire. In one embodiment, a token is expired in 30 seconds after issued by the token generator 125 if not used for a login. In another embodiment, the token expired when the client is logged out. In another embodiment, the token may expire when a user idled without any keyboard activity over a predetermined time period.

Column 225 may include IP address. The IP address may be the IP address of the token agent 110 or the access agent 105. In one embodiment, the token agent and the access agent are two applications on a cell phone, column 225 is the IP address of the mobile phone. In one embodiment, the token agent and the access agent are two separate devices, column 225 can include the IP address of either the token agent, or the access agent, or both.

Column 230 may include user agent. In one embodiment, the user agent refers to the application used to access the service, e.g., types of internet browsers.

Column 235 may include operation granted or denied. In one embodiment hashtags may be used to indicate whether the operation is granted or denied. For example, "write ∩g" may indicate a write operation was granted. In another example, "write #d" may indicate a write operation was denied. In one embodiment, the column 235 may record all operations granted or denied in relation to a specific client. In, another embodiment, the column 235 may record all operations granted or denied in relation to a specific file.

FIG. 3 is a schematic diagram showing a mechanism 300 generating a token according to one embodiment of the disclosure. As shown in FIG. 3, the mechanism 300 uses source information 301 to generate the token 302.

The source information 301 includes IP address 305, a time in millisecond 310, a random text string 315, a random number 320, and a user agent 325. The IP address 305 may be the IP address of the token agent 110 and/or the access agent 105. The time in millisecond 310 can be a time representing the time the token generation request was made or the time the token was generated. The random string 315 is a text string randomly generated. The random number 320 is a multi-digit number randomly generated. The user agent 325 may be the application or the type of internet browser used for accessing the service.

The token 302 includes portion1 355, portion2 360, portion3 365, portion4 370, and portion5 375. The mechanism 300 applies algorithm1 330 to transform IP address 305 to portion1 355. The mechanism 300 applies algorithm2 335 to transform the time in millisecond 310 to portion2 360. The mechanism 300 applies algorithm3 340 to transform random string 315 to portion3 365. The mechanism 300 applies algorithm4 345 to transform random number 320 to portion4 370. The mechanism 300 applies algorithm5 350 to transform user agent 325 to portion5 375.

In one embodiment, the mechanism 300 may use a single algorithm to transform the source information 301 to the token 302, instead of using different algorithms for different portions.

Figure 4:
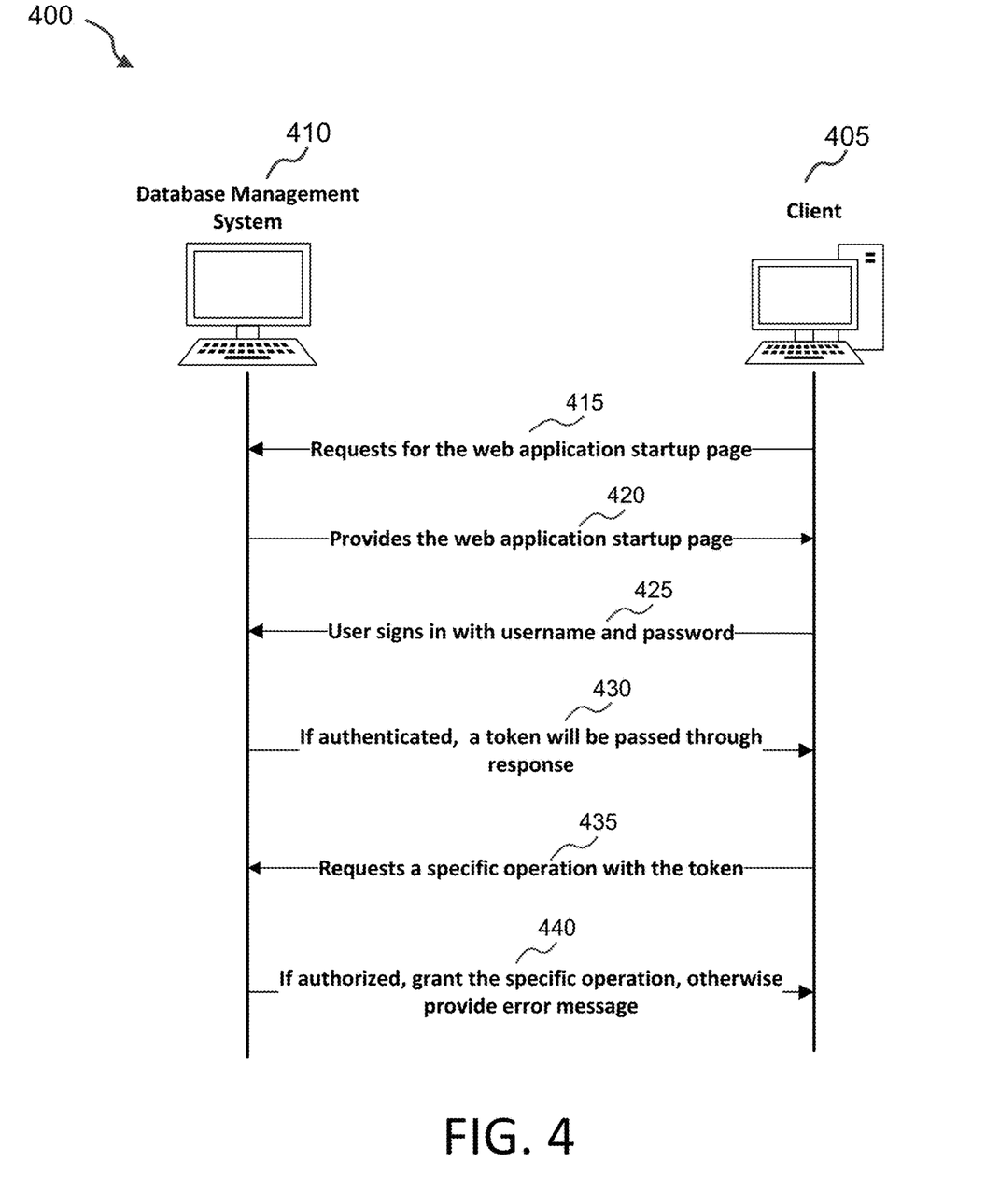
FIG. 4 is a schematic diagram showing the interactions between a client and a database management system according to one embodiment of the disclosure.

FIG. 4 is a schematic connection architect 400 showing the interactions between a client 405 and a database management system 410 according to one embodiment of the disclosure.

At 415, the architect 400 starts with the client 405 sending a request to the database management system asking for web application startup page. At 420, the database management system 410 responds to the request with the web application startup page.

At 420, the startup page includes at least spaces for the client to enter username and password for authentication purposes. At 425, the client 405 enters the username and password for authentication.

At 430, if authenticated, the database management system 410 will send the client 405 a token. At 435, the client requests a specific operation with the token information. In one embodiment, the database management system 410 will confirm with the client authorization management system 115 whether the client has the authority for the specific operation. The confirmation process includes at least checking the client identity and the token associated thereof. At 440, if the specific operation is authorized, the database management system 410 grants the specific operation. At 440, if the specific operation is not authorized, the database management system denies the specific operation.

Figure 5:
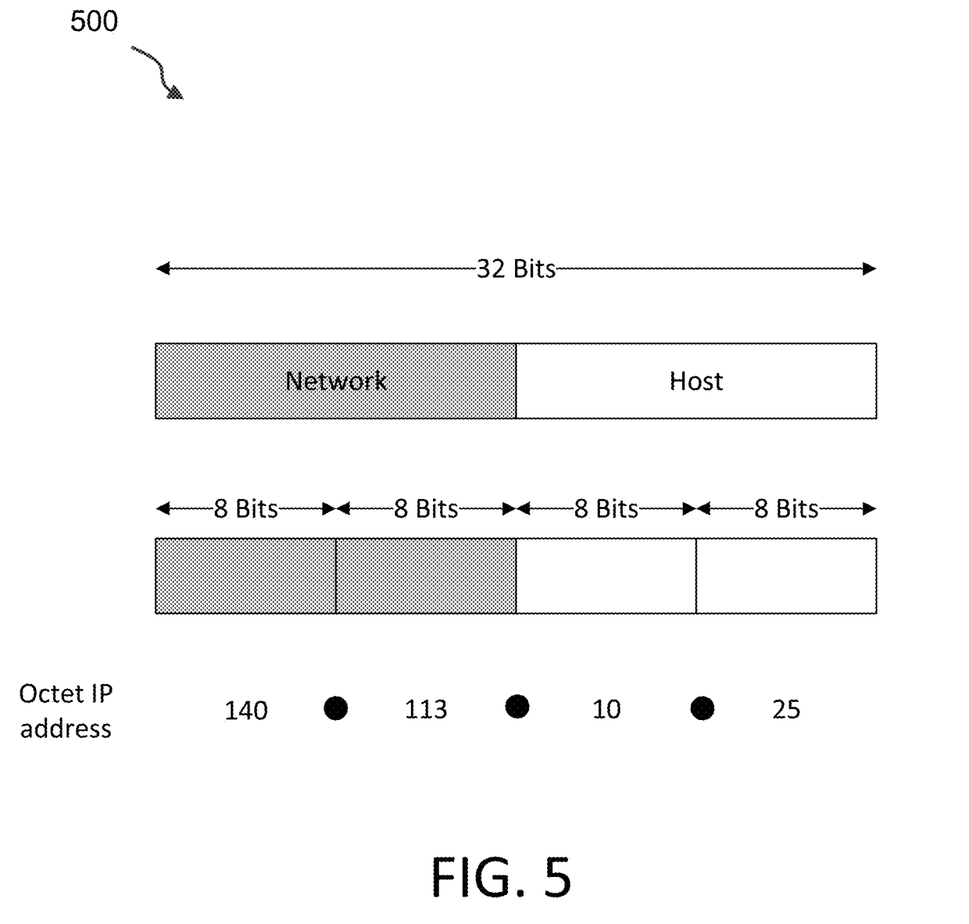
FIG. 5 is an example of IP address according to one embodiment of the disclosure.

FIG. 5 is an example 500 of IP address according to one embodiment of the disclosure. The example 500 includes 32 bits representing the full IP address. The 32 bits full address includes two portions, a network portion and a host portion. The network portion includes 16 bits. The host portion includes another 16 bits. The 16 bits of the network portion can be further divided into two sections of Octet IP address, each octet section includes 8 bits. Similarly, the 16 bits of the host portion can also be divided into two sections of Octet IP address, each octet section includes 8 bits.

Figure 6:
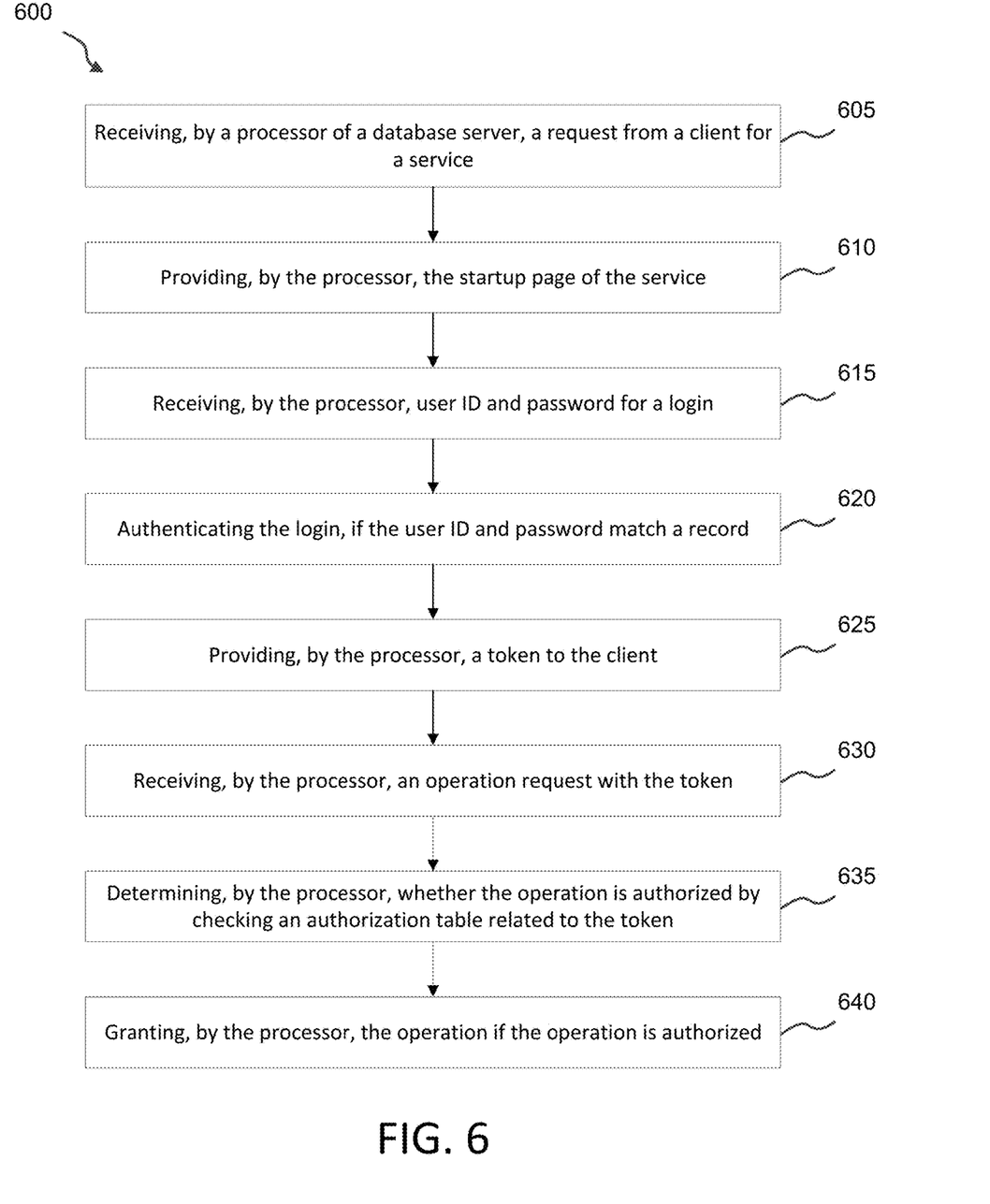
FIG. 6 is a method according to one embodiment of the disclosure.

FIG. 6 is a method 600 according to one embodiment of the disclosure. The method 600 starts at 605 which includes receiving, by the processor of a database server, a request from a client for a service. At 610, the method 600 provides, by the processor, the startup page of the service. The startup page includes space for the client to provide username and password information. At 615, the method 600 receives, by the processor, user ID and password for a login. At 620, the method 600 authenticates the login, if the user ID and password match a record. The record may be, a table including the parings of the user ID and password stored in a machine readable memory accessible by the process. At 625, the method 600 provides a token to the client. At 630, the method 600 receives, by the processor, an operation request with the token. At 635, the method 600 determines, by the processor, whether the operation is authorized by checking an authorization table related to the token. The authorization table includes at least a user ID, the token assigned to the user for the login, and authorized operations for the user. At 640, the method 600 grants, by the processor, the operation if the operation is authorized.

The method 600 can be implemented by the server 702 of FIG. 7. The method 600 can be implemented by the computer system 800 of FIG. 8. The method 600 can be, implemented by the computer system 800 of FIG. 8. The method 600 can be a virtual machine, or emulated system, as shown in FIGS. 9A and 9B.

FIG. 7 illustrates a computer network 700 for obtaining access to database files in a computing system according to one embodiment of the disclosure. The system 700 may include a server 702, a data storage device 706, a network 708, and a user interface device 710. The server 702 may also be a hypervisor-based system executing one or more guest partitions hosting operating systems with modules having server configuration information. In a further embodiment, the system 700 may include a storage controller 704, or a storage server configured to manage data communications between the data storage device 706 and the server 702 or other components in communication with the network 708. In an alternative embodiment, the storage controller 704 may be coupled to the network 708.

In one embodiment the user interface device 710 is referred to broadly and is intended to encompass a suitable processor-based device such as a desktop computer, a laptop computer, a personal digital assistant (PDA) or tablet computer, a smartphone or other mobile communication device having access to the network 708. In a further embodiment, the user interface device 710 may access the Internet or other wide area or local area network to access a web application or web service hosted by the server 702 and may provide a user interface for enabling a user to enter or receive information.

The network 708 may facilitate communications of data between the server 702 and the user interface device 710. The network 708 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

FIG. 8 illustrates a computer system 800 adapted according to certain embodiments of the server 702 and/or the user interface device 810. The central processing unit ("CPU") 802 is coupled to the system bus 804. The CPU 802 may be a general purpose CPU or microprocessor, graphics processing unit ("GPU"), and/or microcontroller. The present embodiments are not restricted by the architecture of the CPU 802 so long as the CPU 802, whether directly or indirectly, supports the operations as described herein. The CPU 802 may execute the various logical instructions according to the present embodiments.

The computer system 800 may also include random access memory (RAM) 808, which may be synchronous RAM (SRAM), dynamic RAM (DRAM), synchronous dynamic RAM (SDRAM), or the like. The computer system 800 may utilize RAM 808 to store the various data structures used by a software application. The computer system 800 may also include read only memory (ROM) 806 which may be PROM, EPROM, EEPROM, optical storage, or the like. The ROM may store configuration information for booting the computer system 800. The RAM 808 and the ROM 806 hold user and system data, and both the RAM 808 and the ROM 806 may be randomly accessed.

The computer system 800 may also include an I/O adapter 810, a communications adapter 814, a user interface adapter 816, and a display adapter 822. The I/O adapter 810 and/or the user interface adapter 816 may, in certain embodiments, enable a user to interact with the computer system 800. In a further embodiment, the display adapter 822 may display a graphical user interface (GUI) associated with a software or web-based application on a display device 824, such as a monitor or touch screen.

The I/O adapter 810 may couple one or more storage devices 812, such as one or more of a hard drive, a solid state storage, device, a flash drive, a compact disc (CD) drive, a floppy disk drive, and a tape drive, to the computer system 800. According to one embodiment, the data storage 812 may be a separate server coupled to the computer system 800 through a network connection to the I/O adapter 810. The communications adapter 814 may be adapted to couple the computer system 800 to the network 708, which may be one or more of a LAN, WAN, and/or the Internet. The user interface adapter 816 couples user input devices, such as a keyboard 820, a pointing device 818, and/or a touch screen (not shown) to the computer system 800. The display adapter 822 may be driven by the CPU 802 to control the display on the display device 824. Any of the devices 802-822 may be physical and/or logical.

The applications of the present disclosure are not limited to the architecture of computer system 800. Rather the computer system 800 is provided as an example of one type of computing device that may be adapted to perform the functions of the server 702 and/or the user interface device 810. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact persons of ordinary skill in the art may utilize any number of suitable structures capable of executing logical operations according to the described embodiments. For example, the computer system 800 may be virtualized for access by multiple users and/or applications.

FIG. 9A is a block diagram illustrating a server hosting an emulated software environment for virtualization according to one embodiment of the disclosure. An operating system 902 executing on a server includes drivers for accessing hardware components, such as a networking layer 904 for accessing the communications adapter 914. The operating system 902 may be, for example, Linux or Windows. An emulated environment 908 in the operating system 902 executes a program 910, such as Communications Platform (CPComm) or Communications Platform for Open Systems (CPCommOS). The program 910 accesses the networking layer 904 of the operating system 902 through a non-emulated interface 906, such as extended net input output processor (XNIOP). The non-emulated interface 906 translates requests from the program 910 executing in the emulated environment 908 for the networking layer 904 of the operating system 902.

In another example, hardware in a computer system may be virtualized through a hypervisor. FIG. 9B is a block diagram illustrating a server hosting an emulated hardware environment according to one embodiment of the disclosure. Users 952, 954, 956 may access the hardware 960 through a hypervisor 958. The hypervisor 958 may be integrated with the hardware 958 to provide virtualization of the hardware 958 without an operating system, such as in the configuration illustrated in FIG. 9A. The hypervisor 958 may provide access to the hardware 958, including the CPU 902 and the communications adaptor 914.

If implemented in firmware and/or software, the functions described above may be stored as one or more instructions or code on a computer-readable medium. Examples include non-volatile computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and, that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A computing system architecture, comprising:
a token generator that generates a token upon receiving a request from a token agent on a client device and returns the token to the token agent;
a database management system in communication with the token generator and receiving the token from the token generator, the database management system using the token to authenticate a user on the client device during a login session for access to the database management system; and
a client authorization system in communication with the token generator and database management system and receiving the token from the token generator, the client authorization system using the token to allow authorization to operations on the database management system by the user, the client authorization system being configured to change allowed authorization to operations on the database management system during the login session without ending the login session;
wherein the token is used both for authenticating the user and for authorizing operations by the user once authenticated during the login session;
wherein the token includes a first portion generated based on an IP address, a second portion based on a time, a third portion based on a random text string, a fourth portion generated based on a random number, and fifth portion generated based on a database access agent.

2. The computing system architecture according to claim 1, wherein the token is associated with a list of authorized operations stored on the client authorization system and accessible by the database management system.

3. The computing system architecture according to claim 2, wherein the database management system confirms whether the client is authorized to perform each and every requested operation requested during a single client login session by using the list of authorized operations.

4. The computing system architecture according to claim 1, wherein the token is generated based on, at least partially, an IP address, a time, a random text string, a random number, and a database access agent.

5. The computing system according to claim 1, wherein the database management system has a processor, the processor performs:
receiving a request from a client for a service;
providing the startup page of the service;
receiving a user ID and password for a login; and
authenticating the login using the token, if the user ID and the password match a record.

6. The computing system according to claim 5, wherein the processor receives an operation request with the token.

7. The computing; system according to claim 6, wherein the processor determines whether the operation is authorized by checking the list of authorized operations and grants the operation request if the operation is authorized.

* * * * *